(12) United States Patent
Lin

(10) Patent No.: US 9,104,250 B2
(45) Date of Patent: Aug. 11, 2015

(54) REAL-TIME QUANTIFYING SYSTEM FOR USE IN QUANTIFYING INPUT DEVICE USER BEHAVIOR

(71) Applicant: THERMALTAKE TECHNOLOGY CO., LTD., Taipei (TW)

(72) Inventor: Pei-Hsi Lin, New Taipei (TW)

(73) Assignee: THERMALTAKE TECHNOLOGY CO., LTD. (TW)

( * ) Notice: Subject to any disclaimer, the term of this patent is extended or adjusted under 35 U.S.C. 154(b) by 83 days.

(21) Appl. No.: 13/939,390

(22) Filed: Jul. 11, 2013

(65) Prior Publication Data

US 2014/0204028 A1    Jul. 24, 2014

(30) Foreign Application Priority Data

Jan. 22, 2013   (TW) .............................. 102201387 U

(51) Int. Cl.
```
G06F 3/03        (2006.01)
G06F 3/0354      (2013.01)
G06F 3/038       (2013.01)
G06Q 10/06       (2012.01)
```
(52) U.S. Cl.
CPC ............ *G06F 3/03543* (2013.01); *G06F 3/038* (2013.01); *G06Q 10/0639* (2013.01)

(58) Field of Classification Search
None
See application file for complete search history.

(56) References Cited

U.S. PATENT DOCUMENTS

| | | | | |
|---|---|---|---|---|
| 4,292,469 A | * | 9/1981 | Scott et al. ..................... | 704/208 |
| 2011/0015504 A1 | * | 1/2011 | Yoo ............................... | 600/301 |
| 2011/0053556 A1 | * | 3/2011 | Masaryk et al. .............. | 455/406 |

* cited by examiner

*Primary Examiner* — Joseph Haley
(74) *Attorney, Agent, or Firm* — Schmeiser, Olsen & Watts, LLP

(57) ABSTRACT

A real-time quantifying system for use in quantifying input device user behavior is introduced. The real-time quantifying system performs real-time quantification on user behavior of at least an input device operating and controlling a computer apparatus. The real-time quantifying system includes an input device and a portable electronic device connected thereto by wireless connection. The input device includes a sensing module and a wireless communication module. Various data detected during a process of operation of the computer apparatus by a user are sent by the input device to the portable electronic device in real time. Then, the data are processed by the portable electronic device to generate a graphical data for display. Accordingly, the real-time quantifying system displays the user's control status in real time and assesses the user's attributes and user behavior according to the graphical data.

12 Claims, 5 Drawing Sheets

REAL-TIME QUANTIFYING SYSTEM FOR USE IN QUANTIFYING INPUT DEVICE USER BEHAVIOR

CROSS-REFERENCE TO RELATED APPLICATION

This non-provisional application claims priority under 35 U.S.C. §119(a) on Patent Application No(s). 102201387 filed in Taiwan, R.O.C. on Jan. 22, 2013, the entire contents of which are hereby incorporated by reference.

FIELD OF TECHNOLOGY

The present invention relates to real-time quantifying systems, and more particularly, to a real-time quantifying system for use in quantifying user behavior of a user operating an input device which operates a computer apparatus.

BACKGROUND

Recent years see the rapid development of the computer industry and the ever-increasing speed at which computers operate, and thus the ever-increasing development of markets derived from computer-based computation and data processing. Hence, a computer apparatus is indispensable to markets pertaining to medicine, entertainment, services, etc.

Some fields manifest strict requirements and wide application regarding the control over the aforesaid apparatus. For example, the entertainment-oriented games market requires players to play games by exercising precise control thereof, wherein the user behavior associated with control-oriented input devices operated by the players is treated as an important piece of information which is not only related to the player attribute but also plays a very important role in player training.

Accordingly, it is imperative to provide a system for applying efficiently various control-related data pertaining to games players.

SUMMARY

It is an objective of the present invention to display a user's control-related data in a real-time manner.

Another objective of the present invention is to display a user's control-related data in a graphical and/or tabular format.

In order to achieve the above and other objectives, the present invention provides a real-time quantifying system for use in quantifying input device user behavior, wherein the real-time quantifying system performs real-time quantification on user behavior of at least an input device operating and controlling a computer apparatus, the real-time quantifying system comprising: at least an input device for operating and controlling the computer apparatus, the at least an input device each comprising at least a sensing module and a wireless communication module, the at least a sensing module generating at least a sensing signal, and the wireless communication module receiving the at least a sensing signal and wirelessly transmitting the at least a sensing signal; and a portable electronic device wirelessly connected to the at least an input device, adapted to receive the at least a sensing signal, and adapted to perform real-time computation according to the at least a sensing signal received and thereby create at least a graphical data to be displayed on the portable electronic device.

In an embodiment of the present invention, the at least an input device comprises a mouse input device adapted to operate and control the computer apparatus and having at least a sensing module and a wireless communication module, the at least a sensing module generating at least a sensing signal, and the wireless communication module receiving the at least a sensing signal and wirelessly transmitting the at least a sensing signal.

In an embodiment of the present invention, the at least an input device further comprises a keyboard input device adapted to operate and control the computer apparatus and having at least a sensing module and a wireless communication module, the at least a sensing module generating at least a sensing signal, and the wireless communication module receiving the at least a sensing signal and wirelessly sending to the portable electronic device the at least a sensing signal whereby the portable electronic device creates the at least a graphical data.

In an embodiment of the present invention, the at least an input device further comprises a sound input device adapted to provide a voice sensing signal to the computer apparatus and having a sound sensing module and a wireless communication module, the sound sensing module generating the voice sensing signal, and the wireless communication module receiving the voice sensing signal and wirelessly sending to the portable electronic device the voice sensing signal whereby the portable electronic device creates the at least a graphical data.

In an embodiment of the present invention, the at least a sensing module comprises a recorder for recording an operating, controlling, and pressing history of the keyboard input device and/or an infrared sensor.

In an embodiment of the present invention, the wireless communication module is a Bluetooth communication module.

In an embodiment of the present invention, the at least a sensing module comprises an acceleration sensor, a motion track recorder, an infrared sensor, and/or a recorder for use with the mouse input device.

In an embodiment of the present invention, the portable electronic device comprises a computer program product executable by the portable electronic device to compute in a real-time manner the at least a graphical data to be displayed, according to the currently received at least a sensing signal of the at least an input device.

Accordingly, the present invention is characterized in that a user's real-time control-related data is obtained by means of real-time surveillance performed with an input device, such that the user's attributes and user behavior can be assessed in accordance with at least a graphical data and then analyzed and modified.

BRIEF DESCRIPTION

Objectives, features, and advantages of the present invention are hereunder illustrated with specific embodiments in conjunction with the accompanying drawings, in which.

DETAILED DESCRIPTION

Figure 1:
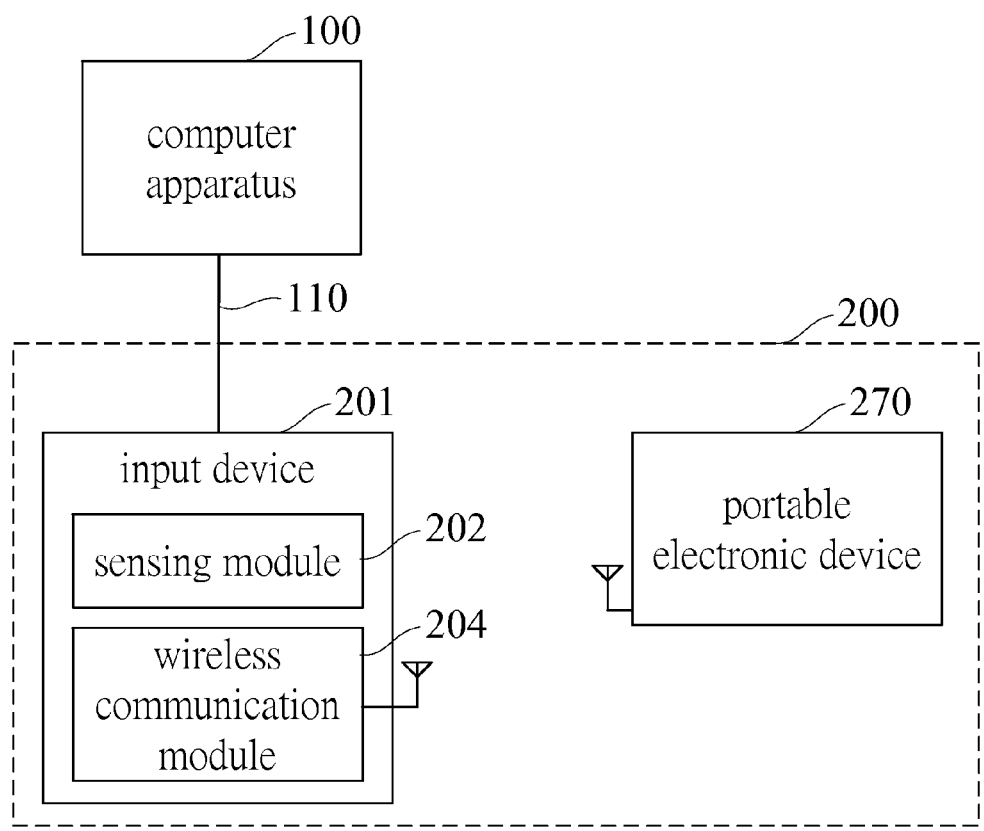
FIG. 1 is a block diagram of a real-time quantifying system for use in quantifying input device user behavior according to an embodiment of the present invention.

Referring to FIG. 1, there is shown a block diagram of a real-time quantifying system for use in quantifying input device user behavior according to an embodiment of the present invention.

The real-time quantifying system of the present invention is for use with a computer apparatus 100 in performing real-time quantification on user behavior of at least an input device upon receipt of at least a sensing signal from at least an input device. The connection of the computer apparatus 100 and an input device 201 is a cable connection 110 or a wireless connection (not shown). The connection of the input device 201 and a portable electronic device 270 is a wireless connection which has the same module and means of connection as the wireless connection of the input device 201 and the computer apparatus 100, for example, using a single Bluetooth communication module to function as an input device and send control-related data to the computer apparatus 100 and the portable electronic device 270. Persons skilled in the art understand that the control-related data sent to the computer apparatus 100 is merely fundamental control-related data, whereas the control-related data sent to the portable electronic device 270 is diverse control-related and detection-related data which is described later. Alternatively, the fundamental control-related data is sent to the computer apparatus 100 by a self-contained wireless communication module, whereas the diverse control-related and detection-related data is sent to the portable electronic device 270 by another self-contained wireless communication module.

Referring to FIG. 1, the real-time quantifying system 200 of the present invention comprises at least an input device 201 (although FIG. 1 shows an input device, the present invention is not limited thereto) and the portable electronic device 270. The input device 201 is required for operating and controlling the computer apparatus 100, that is, sending a control signal to the computer apparatus 100 to thereby enable the computer apparatus 100 to perform a corresponding functional operation. The input device 201 comprises at least a sensing module 202 and a wireless communication module 204 connected to the at least a sensing module 202. The at least a sensing module 202 generates at least a sensing signal. The wireless communication module 204 receives the at least a sensing signal and then sends by a wireless connection the at least a sensing signal.

Figure 2:
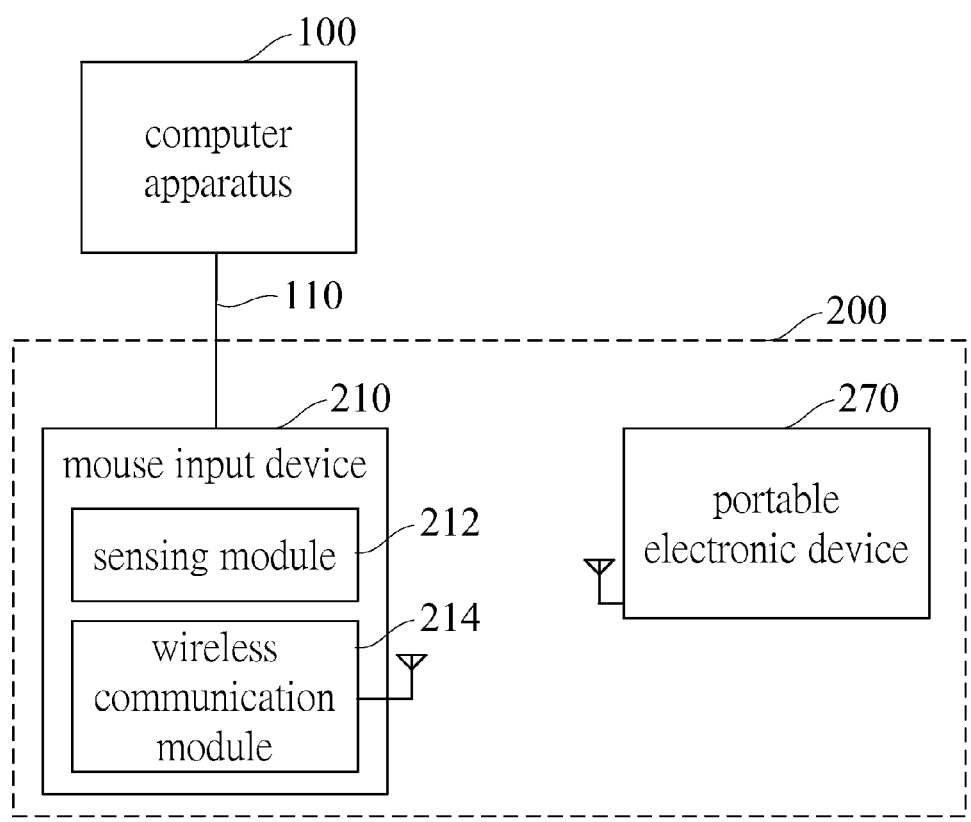
FIG. 2 is a block diagram of the real-time quantifying system for use in quantifying input device user behavior according to another embodiment of the present invention.

Referring to FIG. 2, there is shown a block diagram of the real-time quantifying system for use in quantifying input device user behavior according to another embodiment of the present invention. As shown in FIG. 2, in this embodiment, the input device of the real-time quantifying system 200 is a mouse input device 210. The mouse input device 210 is required for operating and controlling the computer apparatus 100. The mouse input device 210 comprises at least a sensing module 212 and a wireless communication module 214 connected to the at least a sensing module 212. The at least a sensing module 212 generates at least a sensing signal. The wireless communication module 214 receives the at least a sensing signal and then sends by a wireless connection the at least a sensing signal.

The at least a sensing module 212 further comprises an acceleration sensor, a motion track recorder, an infrared sensor, and/or a recorder for use with the mouse input device. The acceleration sensor detects the strength of a force exerted by the user on the mouse input device 210. The motion track recorder detects the motion track of the mouse input device 210 being moved on a plane by the user. The infrared sensor detects the user's hand temperature during the control process to thereby assess the degree of stress manifested by the user. The recorder for use with the mouse input device records how the user presses or uses a roller and sends the recorded data.

The portable electronic device 270 is connected to the mouse input device 210 by a wireless connection so as to receive the at least a sensing signal. Then, the portable electronic device 270 computes and generates at least a graphical data in accordance with the received at least a sensing signal, such that the at least a graphical data is displayed on the portable electronic device 270. The portable electronic device 270 comprises a Bluetooth communication module (not shown) whereby the portable electronic device 270 is connected to the mouse input device 210 by wireless connection to thereby receive the at least a sensing signal sent from the wireless communication module of the mouse input device 210. The at least a graphical data is defined by an application (such as an App for use with a smartphone and a tablet computer) installed on the portable electronic device 270, such that the at least a sensing signal received can be expressed by the graphical data, and the user can choose, as needed, what said graphical data to analyze and monitor.

Figure 3:
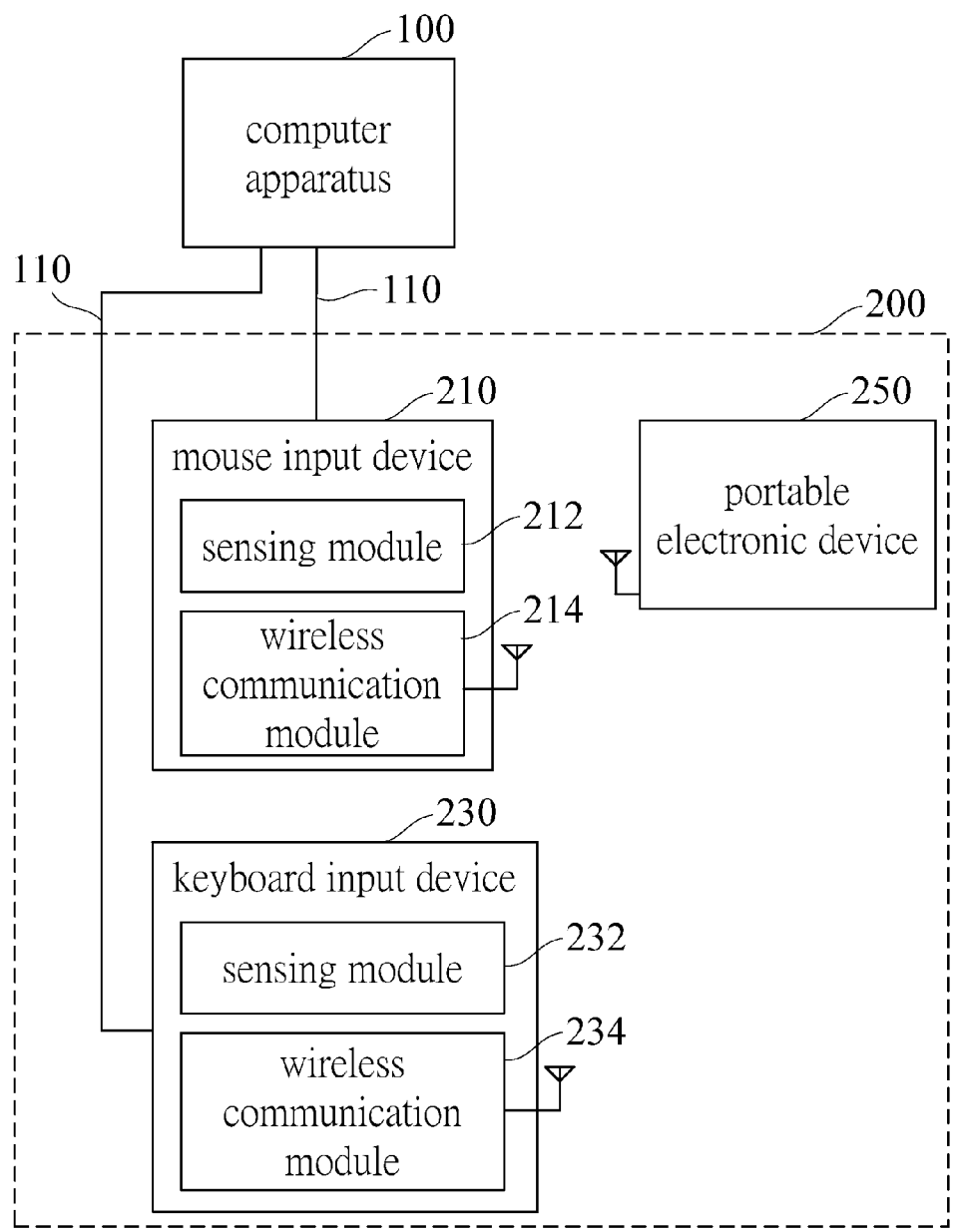
FIG. 3 is a block diagram of the real-time quantifying system for use in quantifying input device user behavior according to yet another embodiment of the present invention.

Referring to FIG. 3, there is shown a block diagram of the real-time quantifying system for use in quantifying input device user behavior according to yet another embodiment of the present invention. As shown in FIG. 3, the real-time quantifying system 200 further comprises a keyboard input device 230. The keyboard input device 230 is also for use in controlling the computer apparatus 100. The keyboard input device 230 comprises at least a sensing module 232 and a wireless communication module 234. The at least a sensing module 232 generates at least a sensing signal. The wireless communication module 234 receives the at least a sensing signal and then sends by a wireless connection the at least a sensing signal to the portable electronic device 270. The at least a sensing signal sent from the keyboard input device 230 enables the portable electronic device 270 to generate the at least a graphical data. As mentioned earlier, the cable connection 110 can also be replaced with a wireless connection (not shown).

The at least a sensing module 232 comprises a recorder for use with the keyboard input device 230 in recording an operating, controlling, and pressing history and/or an infrared sensor. The recorder for use with the keyboard input device 230 records data, such as the sequence of specific keys pressed by the user, and point in time of the user's pressing the specific keys. The infrared sensor detects the user's hand temperature.

Figure 4:
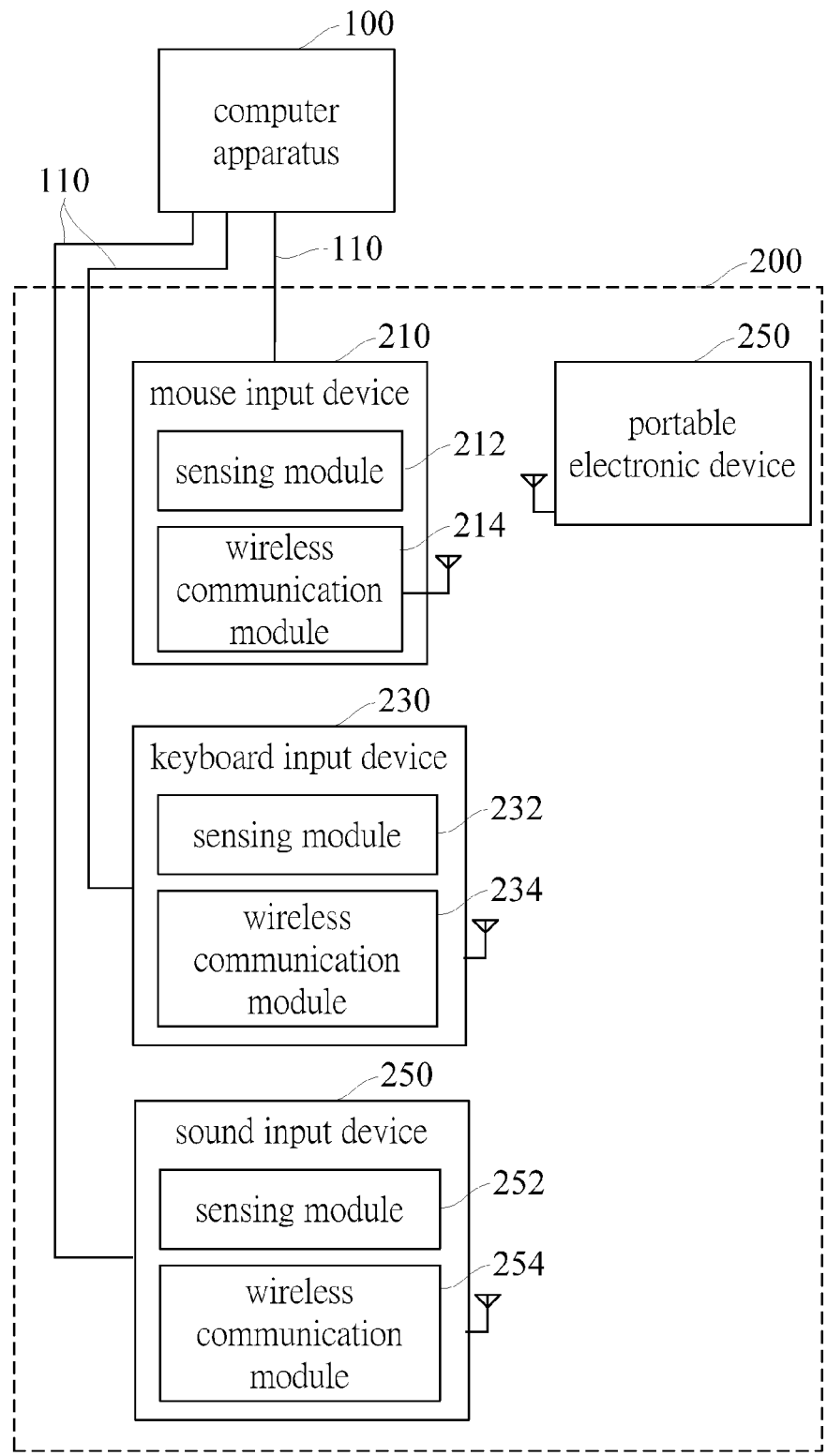
FIG. 4 is a block diagram of the real-time quantifying system for use in quantifying input device user behavior according to a further embodiment of the present invention.

Referring to FIG. 4, there is shown a block diagram of the real-time quantifying system for use in quantifying input device user behavior according to a further embodiment of the present invention. As shown in FIG. 4, the real-time quantifying system 200 further comprises a sound input device 250. The sound input device 250 sends a voice sensing signal to the computer apparatus 100 to thereby controllably cause the computer apparatus 100 to process the voice sensing signal, for example, sending the voice sensing signal to a remote computer apparatus (not shown) to play the voice sensing signal. The sound input device 250 comprises a sound sensing module 252 and a wireless communication module 254. The sound sensing module 252 generates the voice sensing signal. The wireless communication module 254 receives the voice sensing signal and then sends, by a wireless connection, the voice sensing signal to the portable electronic device 270. The voice sensing signal sent from the sound input device 250 enables the portable electronic device to create the at least a graphical data, such as a graph of the user's voice intonation against time. Furthermore, the sound input device 250 comprises an earpiece and plays a sound signal received by the portable electronic device 270.

Figure 5:
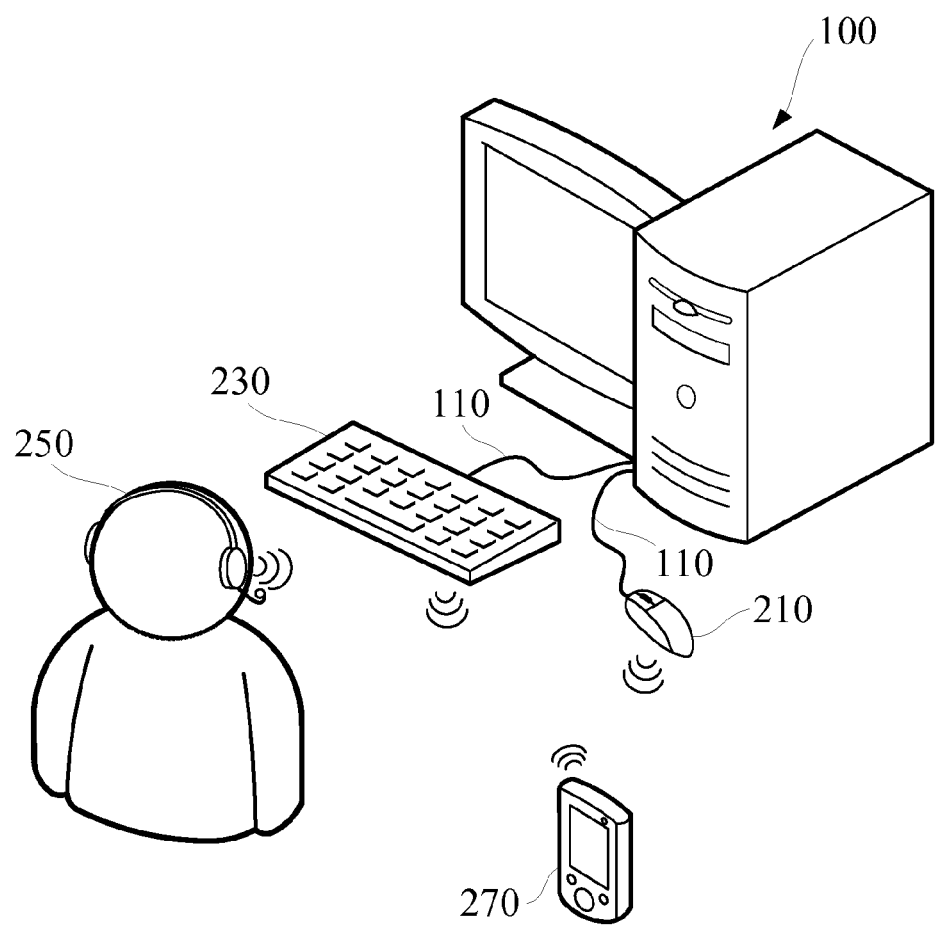
FIG. 5 is a schematic view of the real-time quantifying system of FIG. 4.

Referring to FIG. 5, there is shown a schematic view of the real-time quantifying system of FIG. 4. As shown in FIG. 5, during the process of operation of the computer apparatus 100 by the user, the mouse input device 210 and the keyboard input device 230 send data to the portable electronic device 270 in a real-time manner, whereas data pertaining to the conversation of the user during the control process is sent to the portable electronic device 270 by means of the sound input device 250 for the sake of recordation. The sound input device 250 is connected to the computer apparatus 100 by a wireless connection. Hence, after graphical data has been created by computation and statistical analysis, the portable electronic device 270 displays the graphical data in real time, and then displays the user's statuses in real time for the user's reference. For example, as regards the mouse input device 210, it is feasible to determine whether the control exercised by the user is appropriate, by giving considerations to the result of statistical analysis of related data, such as the relationship between the control track of the user along a time axis and the points in time at which the user presses the keys, or giving considerations to a graph of the number of specific keys pressed by the user against time.

The portable electronic device 270 comprises a computer program product (an application installed on the portable electronic device 270) capable of achieving the objectives of the present invention. Upon execution of the computer program product, the portable electronic device 270 computes and creates the at least a graphical data in real time in accordance with the currently received at least a sensing signal of the mouse input device 210, the keyboard input device 230 and the sound input device 250. After studying the technical solutions disclosed in the present invention and described herein, persons skilled in the art are able to understand that the computer program product can be defined as being given different configurations in accordance with the objects being operated and controlled by the user (that is, user behavior patterns, including various games or webpages browsed by the user) such that, depending on the objects being operated and controlled by the user, the portable electronic device 270 is configured to fetch specific sensing signal-related data and display specific graphical data.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A real-time quantifying system for use in quantifying input device user behavior, wherein the real-time quantifying system performs real-time quantification on user behavior of at least an input device operating and controlling a computer apparatus, the real-time quantifying system comprising:

at least an input device for operating and controlling the computer apparatus, the at least an input device each comprising at least a sensing module and a wireless communication module, the at least a sensing module generating at least a sensing signal with respect to the operating and controlling behavior while the at least an input device is being operated and controlled, and the wireless communication module receiving the at least a sensing signal and sending the at least a sensing signal by wireless transmission; and a portable electronic device connected to the at least an input device by a wireless connection, adapted to receive the at least a sensing signal, and adapted to perform real-time computation according to the at least a sensing signal received and thereby create at least a graphical data to be displayed on the portable electronic device.

2. The real-time quantifying system of claim 1, wherein the at least an input device comprises:

a mouse input device adapted to operate and control the computer apparatus and having at least a sensing module and a wireless communication module, the at least a sensing module generating at least a sensing signal, and the wireless communication module receiving the at least a sensing signal and sending the at least a sensing signal by wireless transmission.

3. The real-time quantifying system of claim 2, wherein the at least a sensing module further comprises at least one of an acceleration sensor, a motion track recorder, an infrared sensor, and a recorder for use with the mouse input device.

4. The real-time quantifying system of claim 2, wherein the at least an input device further comprises:

a keyboard input device adapted to operate and control the computer apparatus and having at least a sensing module and a wireless communication module, the at least a sensing module generating at least a sensing signal, and the wireless communication module receiving the at least a sensing signal and sending by wireless transmission to the portable electronic device the at least a sensing signal whereby the portable electronic device creates the at least a graphical data.

5. The real-time quantifying system of claim 4, wherein the at least a sensing module comprises at least one of a recorder for recording an operating, controlling, and pressing history of the keyboard input device and an infrared sensor.

6. The real-time quantifying system of claim 4, wherein the wireless communication module is a Bluetooth communication module connected to a Bluetooth transmission component of the portable electronic device.

7. The real-time quantifying system of claim 4, wherein the at least a sensing module comprises at least one of an acceleration sensor, a motion track recorder, an infrared sensor, and a recorder for use with the mouse input device.

8. The real-time quantifying system of claim 4, wherein the at least an input device further comprises:

a sound input device adapted to provide a voice sensing signal to the computer apparatus and having a sound sensing module and a wireless communication module, the sound sensing module generating the voice sensing signal, and the wireless communication module receiving the voice sensing signal and sending by wireless transmission to the portable electronic device the voice sensing signal whereby the portable electronic device creates the at least a graphical data.

9. The real-time quantifying system of claim 8, wherein the sound input device comprises an earpiece for playing a sound signal received from the portable electronic device.

10. The real-time quantifying system of claim 9, wherein the at least a sensing module further comprises at least one of an acceleration sensor, a motion track recorder, an infrared sensor, and a recorder for use with the mouse input device.

11. The real-time quantifying system of claim 10, wherein the wireless communication module is a Bluetooth communication module connected to a Bluetooth communication component of the portable electronic device.

12. The real-time quantifying system of claim 10, wherein the portable electronic device is installed thereon with a computer program product executable by the portable electronic device to compute in a real-time manner the at least a graphical data to be displayed, according to the currently received at least a sensing signal of the at least an input device.

\* \* \* \* \*